United States Patent [19]

Craig

[11] 4,382,570
[45] May 10, 1983

[54] DRAW BAND LINE SUPPORT

[75] Inventor: John L. Craig, Ona, W. Va.

[73] Assignee: Transamerica DeLaval Inc., Princeton, N.J.

[21] Appl. No.: 279,317

[22] Filed: Jul. 1, 1981

[51] Int. Cl.³ .............................................. F16L 3/08
[52] U.S. Cl. .................................. 248/74 R; 24/270; 248/74 B; 248/231; 292/247; 292/256.69
[58] Field of Search ............ 248/74 R, 73, 230, 231, 248/74 B, 677; 24/270, 273, 248 B, 249 B; 292/256.69, 247

[56] References Cited

U.S. PATENT DOCUMENTS

| | | | |
|---|---|---|---|
| 1,501,203 | 7/1924 | Crossley | 292/256.69 |
| 1,959,410 | 5/1934 | Cohen | 248/230 |
| 2,355,096 | 8/1944 | Morehouse | 248/74 B |
| 2,372,682 | 4/1945 | Robertson | 248/74 B |
| 2,649,632 | 8/1953 | Kessler | 24/270 |
| 2,731,280 | 1/1956 | Goodliffe et al. | 292/256.69 X |
| 3,159,708 | 12/1964 | Deal | 248/74 B X |
| 3,330,517 | 7/1967 | Zimmermann | 248/74 R X |
| 3,476,410 | 11/1969 | Pastva | 24/270 X |

FOREIGN PATENT DOCUMENTS 1813125 9/1969 Fed. Rep. of Germany .... 248/74 R

Primary Examiner—William H. Schultz
Assistant Examiner—Ramón O. Ramirez
Attorney, Agent, or Firm—Hopgood, Calimafde, Kalil, Blaustein & Judlowe

[57] ABSTRACT

The invention contemplates support structure for a conduit or the like wherein one of two cylindrically arcuate metal band parts incorporates mounting-bracket or foot structure and the other such part has articulated connection to one, and releasably tensed connection to the other, of the ends of the bracket-carrying cylindrically arcuate part. A liner of flexible resilient material extends circumferentially continuously within the metal-band parts between the releasably connected ends thereof. The releasably tensed connection includes an over-center latch and a redundant safety latch, and in each of the disclosed embodiments mounting-foot structure is integrally formed with one of the metal-band parts.

16 Claims, 8 Drawing Figures

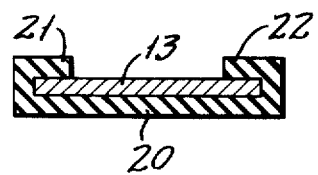
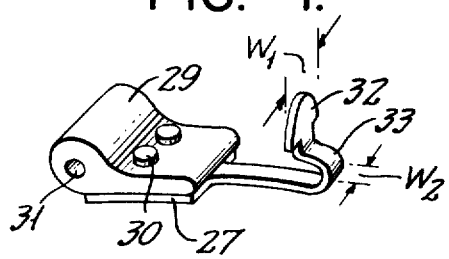
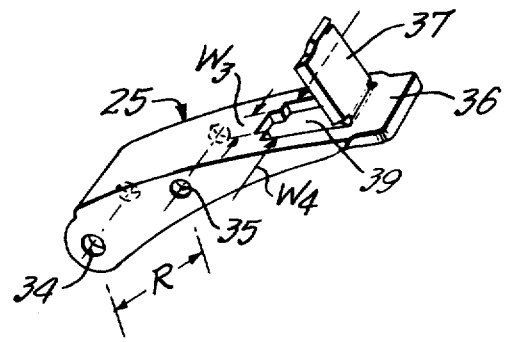
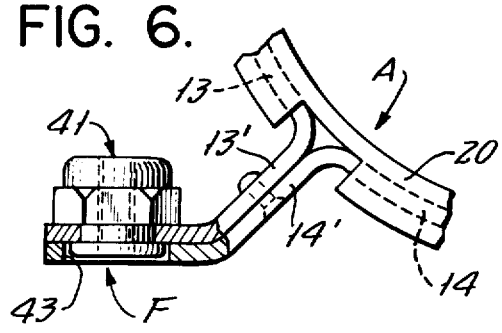
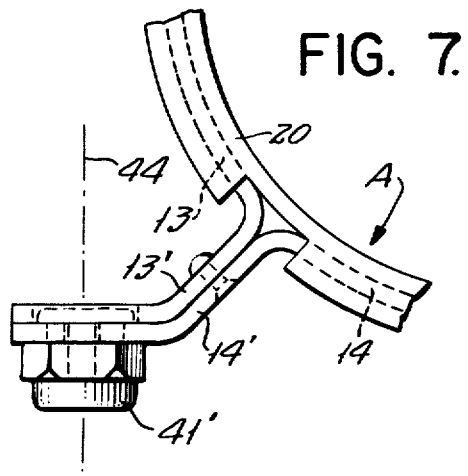
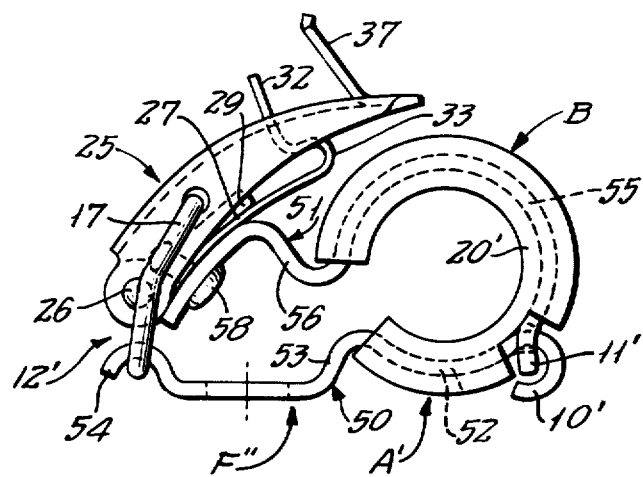

DRAW BAND LINE SUPPORT

BACKGROUND OF THE INVENTION

The invention relates to line-support structure suitable for mounting tubes, conduit, hose, wirebundles, and the like to other structure, such as a frame or wall, so as to provide for neat, orderly and safe installation of thus-mounted lines.

Conventional line supports require the supported article to be installed at the same time that the line support is mounted to other frame or the like structure. This generally requires the use of tools and, occasionally, more than "both hands".

Application situations exist where it is desirable to have a strong, light-weight line support which, once mounted as to a frame, provides "wrenchless" installation and removal of the supported line item, as when frequent assembly and disassembly may be required. Also, situations occur where mounting a conventional line support is prohibited by space and access limitations.

BRIEF STATEMENT OF THE INVENTION

It is an object of the invention to provide an improved device of the character indicated, specifically one wherein all frame-mounting can be a first, non-repeatable operation, prior to attempted assembly of tubing or the like line material thereto.

Another specific object is to provide such a device wherein the nature of the frame-mounting portion thereof is such as to so position an important major fraction of the support that the tubing or other line material to be mounted may be simply and temporarily gravitationally rested in its position and alignment of ultimate clamping, all prior to attempting completion of any clamping operation.

It is another specific object to meet the above objects while also providing virtually 360 degrees of ultimate compressed resilient band support of the tubing, hose, cable or the like line material supported thereby.

A further specific object is to provide integral hinge and mounting-foot formations in such a draw-band support.

The invention achieves the foregoing objects and other features in an assembly of two semi-cylindrically arcuate metal-band halves which have articulated connection at one pair of their adjacent ends, and releasably tensed condition of their other adjacent ends. Supporting foot or bracket structure is an integral radially extending formation of one of these halves, and a flexible liner of resilient material lines the bands and extends continuously between the two releasably connected ends of the articulated bands.

DETAILED DESCRIPTION OF A PREFERRED EMBODIMENT

A preferred embodiment of the invention will be described in detail in conjunction with the accompanying drawings, in which:

FIG. 3 is a sectional view taken at 3—3 in FIG. 1;

FIGS. 4 and 5 are perspective views of two component parts of the structure of FIG. 1;

FIGS. 6 and 7 are fragmentary views to show modifications of a portion of FIG. 1; and FIG. 8 is a view in elevation similar to FIG. 1, but showing a modification.

Figure 1:
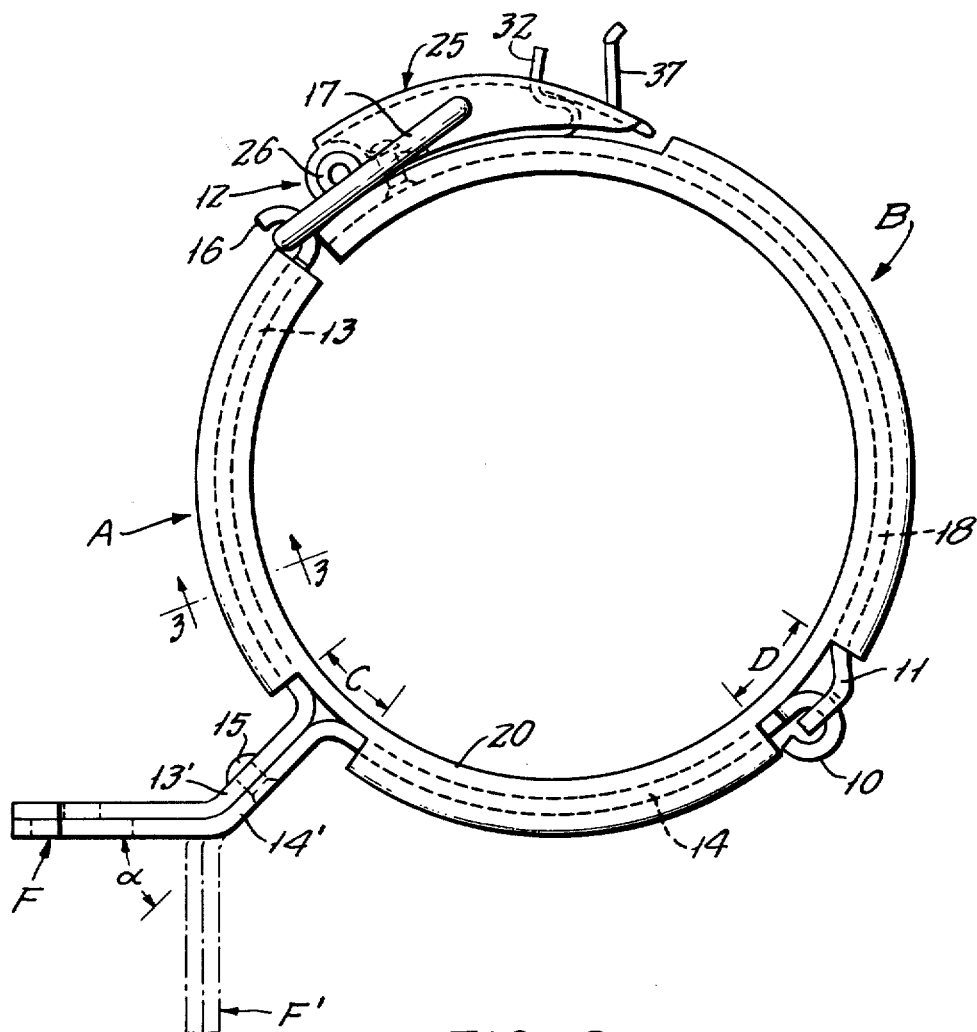
FIG. 1 is a view in side elevation of a draw-band line support of the invention, shown in clamped condition.
Figure 2:
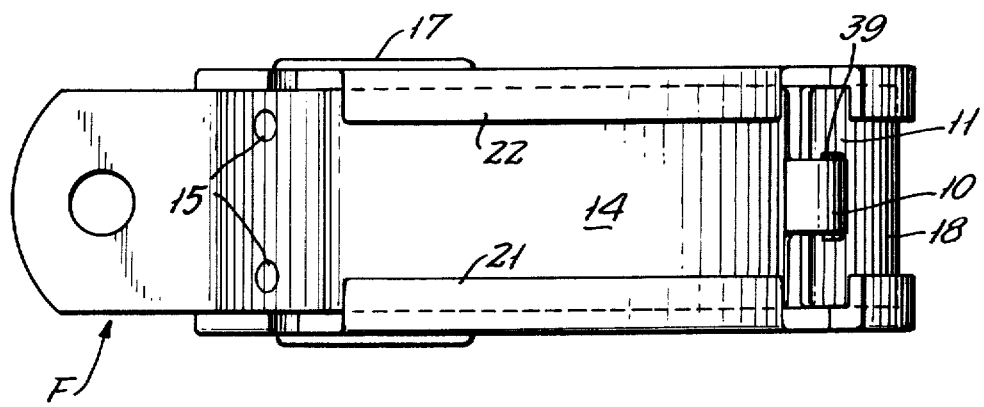
FIG. 2 is a bottom view of the structure of FIG. 1, i.e., as seen from beneath FIG. 1.

Referring initially to FIG. 1, the invention is shown in application to a draw-band line support comprising two semicylindrical metal bands A–B having bent hook (10) and eye or slot (11) hingedly articulated connection at a first of their adjacent ends, and releasably tensed connection via hasp means 12 at their other adjacent ends. The band A may be fashioned of two like quarter-cylindrical elements 13-14 having adjacent radially outward arm or foot portions 13'-14' which may be secured by spot welding but which are shown riveted at 15. The radially outer ends of arm portions 13'-14' are bent at an angle α which is preferably 45°, to enable definition of a flat mounting foot F by which the band part A can be fixedly mounted either to a flat horizontal frame surface or, in 180° reversed condition about the radial direction of the secured portion of arms 13-14', to a flat vertical frame surface, as suggested by phantom outline F'. In either case, therefore, it can be seen that the band part A can be readily fixed to provide a concave semicylinder of line support which extends substantially on both sides of the vertical plane which includes the axis of the cylinder.

As shown, the band portion 13 of part A is formed at its upper end with an outward hook 16 for releasable engagement by the bail 17 of hasp structure to be later described. In similar fashion, the opposite end of band portion 14 is outwardly looped to define the hook 10 of the hinge connection to part B.

Part B is based on a single semicylindrical metal part 18 which is apertured and slightly radially outwardly offset at its lower end 11 of hinge connection to hook 10, while its upper end carries the hasp structure of bail 17. A liner 20 of resilient and flexible elastomeric material circumferentially continuously lines the inner surfaces of band elements 13-14-18 and extends virtually the full 360° from one to the other of the ends which are releasably connectable at 12. Liner 20 is of C-shaped section (see FIG. 3), substantially enveloping the locally applicable band portion (13-14-18) and retains itself assembled thereto via inward flanges 21-22 which lap the outer surface of the applicable band portion; flanges 21-22 are locally cut-away between limits C at the root of arm formations 13'-14', and between limits D at the region of hinge connection 10-11.

The hasp structure at 12 relies upon a lever 25 pivoted to the end of part B, at pin 26. For pivot-pin support, the end of part B may be suitably formed by rolling into a full loop, in a manner analogous to hook 16 but by closure of such a hook; however, in the form shown, preference is indicated for separate fabrication of the subassembly of FIG. 4, being a formed piece of sheet metal having a base 27 which is arcuate for close fit to the outer surface of the metal band 18 of part B. Preassembled to base 27 is a solid body 29, secured by rivets 30 to base 27 and to band 18 and having a loop formation or transverse bore 31 in which the pivot pin 26 is mounted. Integrally formed with the back end of the sheet metal of base 27 is a bent up tab 32 of width W$_1$ exceeding the width of the arched neck 33 by which it is integrally connected to base 27. The function of tab 32 will become clear after hasp lever 25 is further described.

Lever 25 is shown as an elongate inverted cup of formed sheet metal having aligned pivot-pin apertures 34 at one end and aligned bail-connecting apertures 35 at radial offset R from the axis of pin support. The under edges of the cup of lever 25 are arcuate, for conformance with the adjacent outer surface of band 18, when in folded-down position, as shown in FIG. 1. The locations of axis centers at 34–35 on lever 25 are selected so that in lever-actuated approach to the folded position of FIG. 1, the bail-support axis must traverse the geometrical plane defined by (a) the axis of bail engagement to hook 16 and (b) the axis of pivot 26. And in view of the resilient liner 20 which is selected for compressionally loaded support of the intended pipe or other line to be clamped, the folded position of lever 25 achieves a tensed clamp of parts A and B to each other while resiliently clamping the pipe or other line. Upon lifting lever 25 to bring the bail axis 35 above the said plane of hook-engagement and lever-pivoting, the hasp-clamp is released, bail 17 is readily removable from hook 16, and part B may be hinged outward (clockwise in the sense of FIG. 1) to fully open the described structure.

Returning to the hasp lever 25, which is best shown in FIG. 5, its broad and tapering crown 36 is seen to have been lanced to enable a lug 37 to be struck up therefrom. The shape of the lancing is important, for it defines a relatively narrow slot portion 38, of width $W_3$, contiguously opening to a relatively wide slot region 39, of width $W_4$. The narrow-width portion $W_3$ is slightly greater than the neck width $W_2$ (but less than the tab width $W_1$), and the wide-width portion $W_4$ is slightly greater than the tab width $W_1$. The slot region 39 is thus seen to accommodate entry of tab 32 upon actuation of lever 25 to its folded position, and by so locating the notched transition between slot regions 38–39 as to engage and compliantly deflect tab 32 in the course of lever-folding actuation, the neck 33 will be stressed to the point that, upon completion of lever folding, tab 32 will have cleared the upper crown surface 36 of the lever, and neck 33 (beneath tab 32) will snap into the narrow-slot region 38. In this position, tab 32 cannot again pass through lever 25, and so it provides a positive lock against lever 25 dislodgement and, therefore, against release of the clamped drawband action. To release the clamp, it is first necessary to draw tab 32 backward (clockwise in the sense of FIG. 1) until tab 32 clears the narrow-slot region 38, whereupon counterclockwise finger pressure on lug 37 will serve to lift lever 25 enough to carry the bail centers 35 past the dead-center condition. As a practical matter, the releasing clockwise actuation of tab 32 and the lifting counterclockwise actuation of lug 37 may be accomplished by a manual squeeze, using the thumb and a finger of one hand. In other words, even though a primary latch (hasp 12) and a safety latch (tab 32 over lever 25) are both holding the clamp, only a single two-finger squeeze is needed to release both latches.

In the arrangement of FIG. 6, a threaded nut 41 is preassembled to the arm (13') half of the foot formation F, so that for mounting purposes and with the arm (14') half of foot F abutted to a mounting frame member (not shown), a bolt inserted from below and engaged to nut 41 is all that is needed to clamp both halves of foot F in mounted position. It will be understood that, as shown, nut 41 may include a reduced lower end 42 which locates in a smaller hole in arm half 13' and which is outwardly swaged within a larger hole in arm half 14' to retain the assembly of nut 41 to arm half 13', while leaving a clean flat mounting-foot surface on the underside of foot F. The geometrical plane of this surface is preferably substantially tangent to the peripheral cylinder of part A.

In the arrangement of FIG. 7, the smaller and larger mounting holes in the respective halves of foot F are reversed, and the nut 41' is in swaged assembly to the lower arm half 14'. For mounting purposes, the exposed upper flat surface of foot F is applied beneath a frame member (not shown), and the bolt (not shown) is inserted from above in its engagement to nut 41'. It will be noted that the axis alignment 44 of nut 41' is so offset from tangency to the peripheral cylinder of part A as to permit straight alignment of a screwdriver for securing a bolted mounting of the FIG. 7 arrangement.

The embodiment of FIG. 8 is intended for releasable draw-band support of smaller diameter lines than for the case of FIG. 1. The FIG. 8 arrangement still employs two cylindrically arcuate parts A'-B' which are based on stiff metal bands 50–51 having hooked articulated connection at first adjacent ends 10'–11', and releasably clamped connection at 12', being their other adjacent ends. The fixedly mounted one (50) of these bands comprises a single piece of formed material, having a cylindrically arcuate portion 52 with the articulation hook 10' at one end and with a generally radially outward arm formation 53 at its other end; the arm formation 53 includes an angularly bent flat (and suitably apertured) foot portion F" and terminates with a hasp-engageable hook formation 54. The hingedly articulated other (51) of these bands comprises a single piece of formed material, having a cylindrically arcuate portion 55 with the hook-engaged apertured end 11' for articulation with respect to part A', and with a generally radially outward arm formation 56, including a bracket formation 57, at its other end. Arm formations 53–56 are in angularly spaced generally confronting relation, and the hasp structure described for FIG. 1 is carried by bracket formations 57. The parts of the hasp structure therefore carry the same reference numbers as used in FIGS. 1, 4 and 5 and need no further description, beyond identifying the rivet means 58 by which parts 29 and 27 are secured to bracket formation 57.

The described invention will be seen to meet all stated objects and to provide various specific features of convenience, security, stability, precision and inherent simplicity, including:

a. Once mounted, the device of the invention requires only a single hand, for opening and closing the support, release being via a simple two-finger squeeze.

b. The hasp-latch is "over-center", i.e., past dead-center, for inherent retention of the secured position, whether the hasp bail is in a single plane (FIG. 1) or is centrally bent (FIG. 8).

c. In spite of the inherent retention of the hasp-latch, its "over-center" secured position is retained by a safety latch, in such manner that one squeeze releases both latches.

d. Virtually 360° of contact area is available for maximum support of tubing, hose, wire-bundles or the like.

e. The structure lends itself to selective accommodation of a wide variety of elastomeric generics, and lining thicknesses, to suit specific applications.

f. The structure lends itself to repeated removal and installation of supported article, without dismounting the support from the frame to which it is mounted.

g. The draw-band structure is particularly well suited to limited-space applications, by mounting the draw band to frame-structure subassembly and installing the supported article after the frame structure is complete.

h. Wiring runs can be temporarily supported on open draw band supports prior to eliminating slack and making final wiring installation.

i. For any given size and embodiment, mounting centers may be at standard offset from the central axis of draw band support, i.e., from the center of the cylinder of which parts A and B (A' and B') are articulated components. This feature eliminates need to redesign the system to incorporate the draw band of the invention; it also enables direct replacement of a standard series of line supports with draw band supports.

j. The mounting foot, the cylindrical arc of part A (A') and the hinge formation are integrally related.

k. The closure-latch structure operates with high mechanical advantage, thus precluding need for tools to open or close the support clamp.

While the invention has been described in detail for preferred embodiments, it will be understood that modifications may be made within the scope of the invention.

What is claimed is:

1. A draw-band line support comprising two cylindrically arcuate metal bands having articulated connection at one end of their adjacent ends and coacting tension-clamp connecting means releasably interconnecting their other adjacent ends, radially outward mounting-bracket structure on one of said bands, and a single continuous liner of flexible resilient material of generally C-shaped section with retaining flanges retained to both bands, said liner extending circumferentially continuously within said bands from and between said other ends thereof, said liner continuously spanning the region of articulated connection, there being a short discontinuity of said flanges at the region of band articulation, and being adapted to accommodate an articulated opening of said bands to at least the extent of the diametral span of the bands when said other ends are releasably clamped.

2. A draw-band line support comprising two cylindrically arcuate metal bands having articulated connection at one of their adjacent ends and coacting tension-clamp connecting means releasably interconnecting their other adjacent ends, radially outward mounting-bracket structure on one of said bands, and a continuous liner of flexible resilient material extending circumferentially continuously within said bands from and between said other ends thereof, said liner being of generally C-shaped section with retaining flanges circumferentially lapping the outer surfaces of said bands, there being a short discontinuity of said flanges at the region of band articulation.

3. The support of claim 2, in which said one band comprises two cylindrically arcuate portions each with an integrally formed radially outward arm portion, said arm portions being secured in mutual abutment to define said mounting bracket structure.

4. The support of claim 3, in which said cylindrically arcuate portions are of substantially equal extent and said arms include an angularly bent outer mounting portion at radial offset from said arcuate portions.

5. The support of claim 4, in which said angular bend is at substantially 45° to said radial arm portions.

6. The support of claim 3, in which said liner has a second short discontinuity of said flanges at the region of said arm portions.

7. The support of claim 2, in which said articulated connection comprises a hook formation on one of said bands and a slot formation on the other band.

8. The support of claim 2, in which said releasable connecting means comprises a hook formation on one of said bands, a loop formation on the other band, and hasp structure comprising a lever pivoted to said loop formation, said lever carrying a bail at radial offset from the lever-pivot axis, said bail being engageable with said hook formation, and said lever being formed to seat against the exterior of said other band and, when in approach to seated relation, to carry the point of bail-lever connection past the dead-center alignment of said lever-pivot axis and of bail-hook engagement.

9. The support of claim 8, in which said lever and said other band have releasable snap-lock formations engageable to releasably retain the seated position of said lever.

10. A draw-band line support comprising two cylindrically arcuate metal bands having articulated connection at one of their adjacent ends and coacting tension-clamp connecting means releasably interconnecting their other adjacent ends, mounting bracket structure including a generally radially outward integral arm formation on one of said bands, and a continuous liner of flexible resilient material extending circumferentially continuously within said bands from and between said other ends, said liner being of generally C-shaped section with retaining flanges circumferentially lapping the outer surfaces of said bands, there being a short discontinuity of said flanges at the region of band articulation.

11. The support of claim 10, in which said arm formation includes an angularly bent outer mounting-foot formation.

12. The support of claim 11, in which said foot formation is locally flat in a mounting region thereof for mounting abutment to a flat mount surface, the geometrical plane of said locally flat region being substantially tangent to the outer circumference of said support within the arcuate span of said one band.

13. The support of claim 10, in which said integral arm formation is at the releasably clamped end of said one band.

14. The support of claim 10, in which said releasable connecting means comprises a hook formation one one of said bands, a loop formation on the other band, and hasp structure comprising a lever pivoted to said loop formation, said lever carrying a bail at radial offset from the lever-pivot axis, said bail being engageable with said hook formation, and said lever being formed to have a seated position in approach to the exterior of said other band and, when actuated in the direction of said approach, to carry the point of bail-lever connection past the dead-center alignment of said lever-pivot axis and of bail-hook engagement.

15. A draw-band line support comprising two cylindrically arcuate metal bands having articulated connection at one of their adjacent ends and generally radially outward angularly spaced confronting integral arm formations at their other adjacent ends, coacting tension-clamp connecting means for releasably interconnecting said arm formations at radial offset from the geometrical cylinder of said metal bands, and a continuous liner of flexible resilient material extending circumferentially continuously within said bands and between said other ends thereof, said liner being of generally C-shaped section with retaining flanges circumferentially lapping the outer surfaces of said bands, there being a short discontinuity of said flanges at the region of band articulation.

16. The support of claim 15, in which one of said arm formations includes a flat mounting foot region within said radial offset.

* * * * *